United States Patent [19]

Domes et al.

[11] 4,237,950
[45] Dec. 9, 1980

[54] TRACKED ARMORED TIRE ASSEMBLY USING A TWO PIECE GROUSER RETAINER

[75] Inventors: E. A. Domes, Carpentersville; David B. Meisner, Palatine, both of Ill.

[73] Assignee: International Harvester Company, Chicago, Ill.

[21] Appl. No.: 934,159

[22] Filed: Aug. 16, 1978

[51] Int. Cl.³ .............................................. B60C 27/00
[52] U.S. Cl. ........................................ 152/175; 85/35; 152/185.1; 152/187; 305/54
[58] Field of Search ................... 152/175, 176, 185.1, 152/179, 182, 183, 187, 188, 191, 213 A, 213 R, 216; 305/19, 35 EB, 54; 85/32 R, 35

[56] References Cited

U.S. PATENT DOCUMENTS

| | | | |
|---|---|---|---|
| 1,099,510 | 6/1914 | O'Connor | 85/32 R UX |
| 2,441,471 | 5/1948 | Chausse | 152/182 X |
| 4,059,313 | 11/1977 | Beyers et al. | 305/19 |
| 4,071,068 | 1/1978 | Olsen | 152/176 |
| 4,135,564 | 1/1979 | Müller et al. | 152/182 |

Primary Examiner—John T. Goolkasian
Assistant Examiner—Thomas Bokan
Attorney, Agent, or Firm—Douglas W. Rudy; Ronald C. Kamp; F. David AuBuchon

[57] ABSTRACT

A grouser retainer that is positioned between a belt and a tire carcass provides an anchor for attaching one outboard end of a grouser to a tracked tire assembly. A pair of grouser retainers, one at each edge of the track or belt, are used to anchor each grouser as each grouser retainer is less than the full width of the tire tread.

8 Claims, 17 Drawing Figures

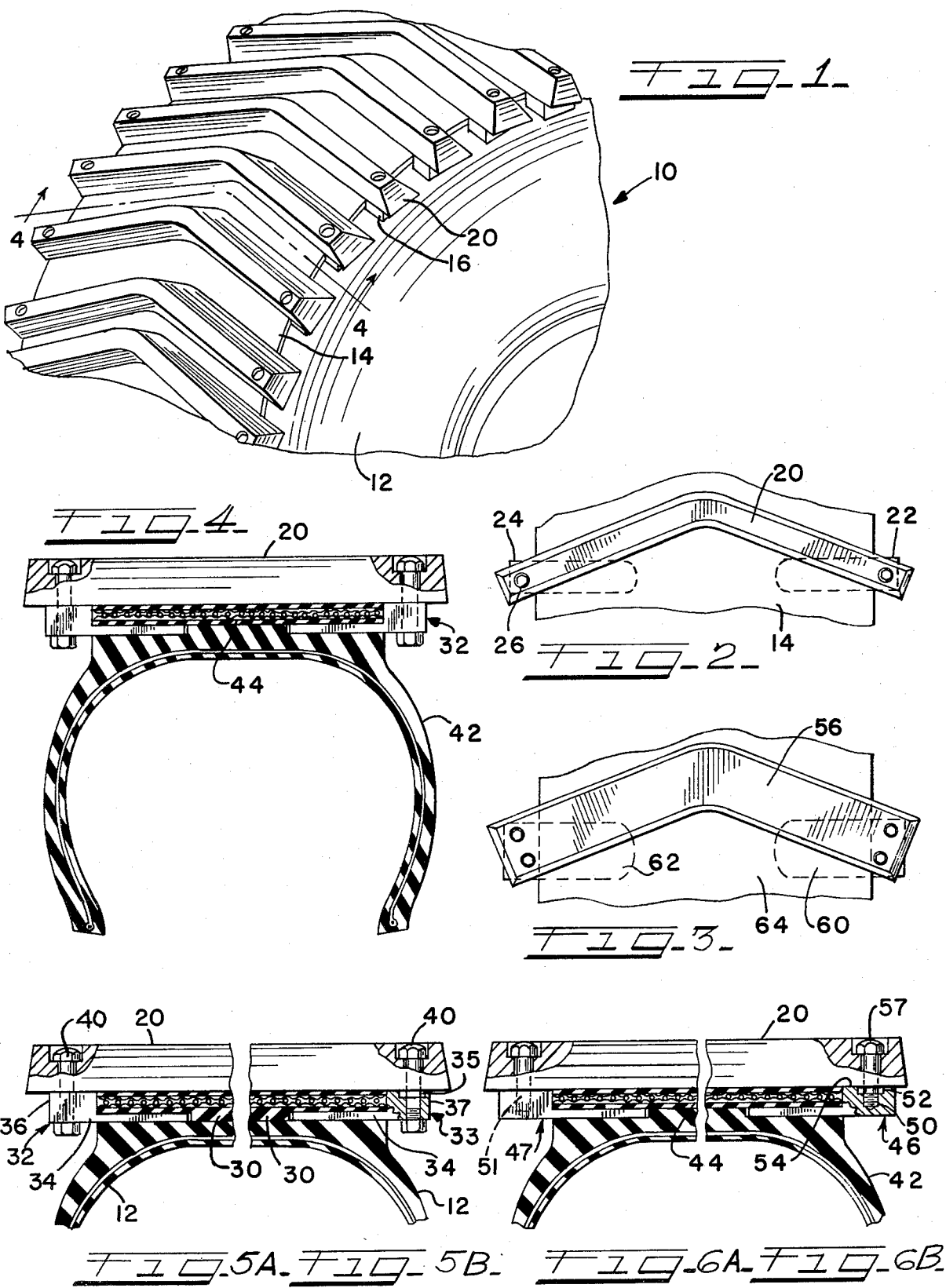

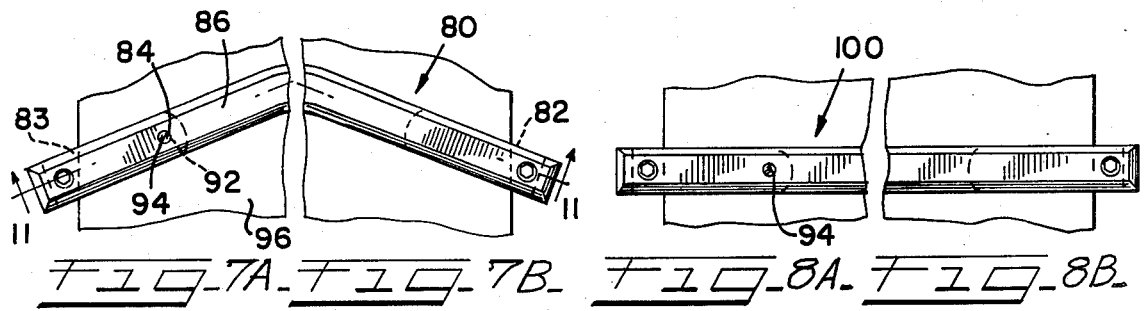
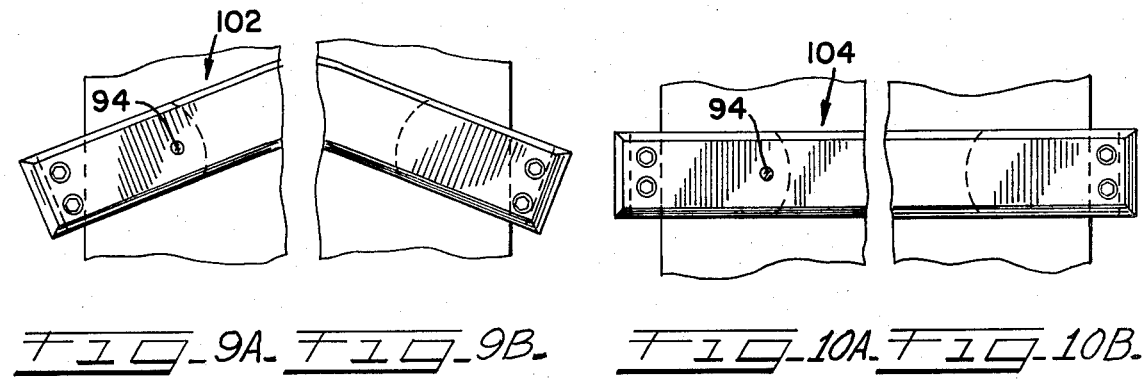
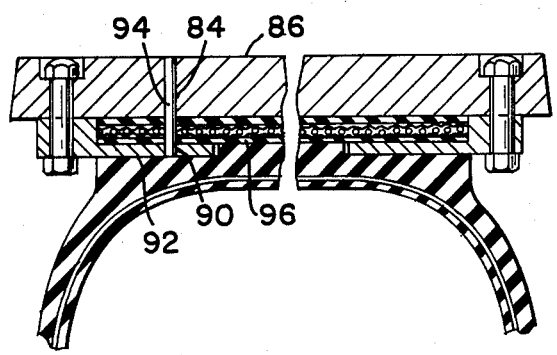

TRACKED ARMORED TIRE ASSEMBLY USING A TWO PIECE GROUSER RETAINER

BACKGROUND OF THE INVENTION

1. Field of the Invention

This invention relates to track-over-tire assemblies incorporating a circumferential belt to which grousers are attached. More particularly this invention is directed to embodiments of grouser retainers or anchors that are positioned between a circumferential elastomer belt and the crown or tread of a tire. The actual grousers are then fastened to these grouser retainers.

2. Description of the Prior Art

It is known to provide a flexible track on a rubber tire, generally of the pneumatic type, in order to enhance the tractive capabilities of the host vehicle as well as to protect the vehicle tire. In many instances the flexible tracks include significant grousers to both armor the belt and tire and provide traction. Typically these grousers are bolted to full width metal plates trapped between the circumferential belt and the tire. The metal plates or grouser retainers have been provided in a plurality of diverse shapes in order to enhance conformity at the belt/tire interface. Even with this multiplicity of designs it appears that no designs in the prior art teach the structure or use of the instant invention as all known prior art grouser retainers are of a length equivalent to full belt or tire width.

SUMMARY OF THE INVENTION

In a tracked armored tire having a tire portion and a circumferential belt encircling the tire a plurality of grouser retainers are provided to allow fastening of ground engaging grousers to the exterior of the belt.

The invention herein is the configuration of the grouser retainers. Each grouser of the track assembly requires a pair of grouser retainers to hold the grouser to the belt. Two short grouser retainers (rather than the single long grouser retainer of the prior art) are provided. These retainers are held between the circumferential belt and the tire carcass itself with the outboard end of the retainer protruding past the edge of the belt. Pockets to accommodate the retainers are molded or otherwise formed into the tire carcass, or alternatively the inner surface of the belt, to accommodate the grouser retainers.

Since the grouser retainers protrude from the edge of the belt and tire assembly and do not completely traverse the full width thereof, they can be removed or inserted without removing the belt.

The advantages povided by this invention include the above noted ease of replacement aspect as well as the advantage of providing excellent grouser security, decreased flexure along sharp break points in the center section of the circumferential belt and decreased weight when compared to prior art devices.

Furthermore a simple, inexpensive, easy to manufacture grouser retainer is provided that has the advantages of conventional grouser retainers and is as efficient in retaining the grouser to the belt as prior art devices.

BRIEF DESCRIPTION OF THE DRAWINGS

These and other advantages of the invention will be apparent from the following description of the invention wherein:

FIG. 1 is a perspective view of a portion of a vehicle tire utilizing this invention;

FIG. 2 is a plan view single grouser as installed on a tire;

FIG. 3 is an alternative grouser and retainer configuration;

FIG. 4 is a section view as taken through section 4—4 of FIG. 1;

FIGS. 5(A) and (B) are sections of a partial armored tire assembly showing alternative embodiments of grouser bar retainer placement relative to the tire carcass as well as alternative grouser bar;

FIGS. 6(A) and (B) are sections of a partial armored tire assembly showing alternative grouser bar retainers positioned between a circumferential belt and a tire carcass having molded in pockets;

FIGS. 7(A) and (B) are top views of a chevron shaped grouser and grouser retainer assembly where the retainers lie under the grouser. FIG. 7(A) includes an auxiliary pin;

FIGS. 8(A) and (B) are top views of a straight grouser and grouser retainer assembly. FIG. 8(A) shows an alternative embodiment having an auxiliary pin;

FIGS. 9(A) and (B) are top views of an alternative double wide chevron grouser and grouser retainer assembly. FIG. 9(A) shows an alternative embodiment having an auxiliary pin;

FIGS. 10(A) and (B) are top views of an alternative double wide straight grouser and grouser retainer assembly. FIG. 10(A) shows an alternative embodiment having an auxiliary pin; and FIGS. 11(A) and (B) are cross section views taken through 11—11 of FIGS. 7(A) and (B).

DETAILED DESCRIPTION OF THE INVENTION

A plurality of embodiments are shown in the drawings figures, each being slightly different, however, in order to avoid undesirable confusion, similar reference characters have been used to identify identical components where possible.

In FIG. 1 a portion of a tire and wheel assembly, generally 10, is shown which embodies this invention. A tire 12 supports a circumferential belt 14 over the tread section of the tire. Between the tire and the belt a plurality of grouser retainers such as one shown generally as 16 are provided to which a plurality of transverse grousers, one shown generally as 20, are bolted.

The actual grouser retainer and configurations are best seen in FIGS. 2 through 11. In FIG. 2 a plan view of the means to attach a single grouser bar provides that the belt 14, shown between a right 22 and a left 24 grouser retainer, and a grouser bar 20 or traction bar, is bolted at each end to the respective right and left grouser retainers by fasteners, such as bolts, through an aperture such as 26 of the grouser 20. The grouser retainers 22 and 24 extend only part way across the width of the belt 14 on the underside thereof.

The grouser retainer can be formed in various shapes. The simplest of these shapes is that of FIG. 5(A) where the tire 12 and the belt 30 are shown in cross section. The grouser retainer generally 32 is a one piece device having an elongated base portion 34 which may have the inboard end rounded off as shown in FIG. 2. Integral with the base portion 34 is a upstanding portion 36 which is apertured to accommodate a fastener, the fastener being bolt and nut assembly 40. The overall height of the upstanding portion is approximately equal to the overall thickness of the belt 30 although it would also be possible to have the height slightly less than the belt thickness to facilitate slight squeeze on the belt when the grouser 20 is bolted to the retainer 32.

Notice that the belt 30 in FIGS. 5(A) and (B) is provided with cavities to accommodate the grouser retainers. When the belt is in position over the tire, which has a smooth flat tread surface, pockets for the grouser retainers are provided and the retainers can then be put in place.

FIG. 5(B) differs from FIG. 5(A) in that the 5(B) retainer generally 33 is provided with a shallow bore 35 in the upstanding portion 37 of the retainer 33.

FIG. 4 embodies an alternative structure. The grouser retainer, generally 32 is identical to that of FIG. 5(A) as are the grouser 20 and the fasteners. The difference is in the belt 44, which is a constant thickness throughout its width, while the tire 42 is provided with a plurality of cavities for accommodating the grouser retainers. This configuration provides the pockets needed to accommodate the grouser retainers generally 32.

Another variation of grouser retainer shape is shown in FIGS. 6(A) and (B). In this alternative the belt 44 and tire 42 are the same as those of FIG. 4. The grouser retainer generally 46 is different in that the upstanding portion 50 which is provided with a shallow bore 52 for improved fatigue life, similar to the retainer generally 33 of FIG. 5(B), is also threaded at 50 to accommodate the threaded fastener 57. The inboard end of the grouser retainer is the end closest to the tire tread centerline (when installed), while the outboard end includes the upstanding apertured portion. This cut away design dictates that the contact between the grouser 20 and the grouser retainer generally 46 is localized to the abutting surfaces at 54.

FIG. 6(A) is similar to FIG. 6(B), however, the grouser retainer generally 47 is not equipped with the shallow bore 52 of the FIG. 6(B) retainer generally 46. Grouser retainer 47 is provided with a threaded bore 51.

The embodiment shown in FIG. 3 is a variation of the embodiments just described. Here the wide grouser 56 is a wider type than those shown in the other figures thus necessitating the use of a pair of wide grouser retainers 60 and 62 that are significantly wider than those of FIG. 2. The wider grouser retainers can accommodate more than the single fasteners and will also provide some advantages relative to load distribution on the belt 64.

The shape of the grousers is not a limitation in this disclosure. The chevron shape grousers were shown as they best allow plan views of the grouser retainers in FIGS. 2 and 3. Straight grousers are shown in FIGS. 8 and 10.

FIGS. 7 through 11 present embodiments that show two basic alternative structures to those already described. The two basic differences are: (1) the placement of the grouser retainers directly underneath and aligned with the grousers, and (2) the use of an auxiliary pin inserted through the grousers and the retainers for further strength.

In FIGS. 7(A) and (B) the chevron shaped grouser generally 80 is bolted to the retainers 82 and 83 as previously described, however, the grouser retainers 82 and 83 lie directly under the chevron shaped grouser. This necesitates angular pockets in either the belt or the carcass. In FIG. 7(A) and FIG. 11(A) a bore 84 is provided through the grouser 86 and is aligned with a second bore 90 in the mating grouser reatiner 92. An auxiliary pin 94, one of a plurality of auxiliary pins, is then inserted through each of these two bores and through the belt 96 to provide another degree of unit between the grouser and its retainer. A typical assembly would include a grouser, a pair of retainers attached to the grouser and a pair of auxiliary pins, one of each pins passing into each of the retainers. This is seen, for example, in FIG. 11A which represents one-half of a full embodiment utilizing two pins. (Notice that FIG. 11B is a distinctly different embodiment from FIG. 11A—as are all "A" and "B" embodiments.)

FIGS. 8(A) and (B) are similar in operation to the FIGS. 7(A) and (B) embodiments, however, the grouser generally 100 is a straight grouser. FIG. 8(A) shows the use of the auxiliary pin 94 while FIG. 8(B) shows just the use of a straight grouser.

FIGS. 9(A) and (B) are a further variation on the theme of FIGS. 7(A) and (B) with the difference in the double wide grouser generally 102. FIG. 9(A) shows the utilization of the auxiliary pin 94 while FIG. 9(B) shows an unpinned assembly.

FIGS. 10(A) and (B) are a variation of the assembly shown in FIGS. 8(A) and (B) with the straight double wide grouser generally 104 pinned in FIG. 10(A) by pin 94 and without the pin in FIG. 10(B).

FIGS. 11(A) and (B) are cross section views through plane 11—11 of FIGS. 7(A) and (B), however, it is representative of all the embodiments in FIGS. 7 through 10. FIG. 11(A) shows a grouser 86 pierced by a bore 84 to accept pin 94 that extends into the second bore 90 in the retainer 92. FIG. 11(B) shows the cross section of an embodiment without the pin for comparison.

The pin 94 in all the FIGS. can be either a smooth sided pin, a spring pin or a threaded pin. Relatively easy extraction is desirable in order to allow quick changing of the grouser retainers or grousers.

The pin 94 passes through the belt 96 which may be either a forced fit or alternatively the belt may be perforated to accommodate the pin.

In summary it should be understood that a plurality of grouser shapes have been illustrated and the choice of one shape over another is a matter of design preference. In actual practice it may be found that it is always more economical to provide the grouser retainer pockets in the circumferential belts rather than in the tire proper. Furthermore, the narrow width grouser retainer may be the least expensive to manufacture therefore this combination may be preferred.

It is apparent that a plurality of grouser retainer embodiments have been provided that fully satisfy the objects and advantages of this invention as set forth above. It is evident that many alternative embodiments and variations will be apparent to those skilled in the art in light of this disclosure. For instance, a contemplated modification to the retainers would be to reshape the inner end from the rounded off shape to an alternative shape, also it is contemplated that the base portions of the retainers could be curved along their longitudinal axis in order to conform to the arcuate tread contour of the host tire. Another option would be to replace the bolt and nut assembly 40 shown in the figures with a plow bolt and nut. The grouser could have a forged bolt seat. Accordingly, this disclosure is intended to embrace any such alternatives that fall within the spirit and scope of the appended claims.

What is claimed is:

1. A tracked tire assembly comprising:
   a pneumatic tire having a tread surface;
   a circumferential belt encircling the tread surface portion of said tire in contact with said tread surface thereof;
   a plurality of left grouser retainers extending part way across the width of said belt, said left grouser retainers accommodated between said tread portion of said tire and said circumferential belt;
   a plurality of right grouser retainers extending part way across the width of said belt toward said plurality of left grouser retainers, said right grouser retainers accommodated between said tread portion of said tire and said circumferential belt;
   a plurality of grousers which extend continuously across the width of said circumferential belt and carried on an outer surface of said circumferential belt, each grouser attached to one of said left grouser retainers and one of said right grouser retainers.

2. The invention in accordance with claim 1 wherein said circumferential belt is provided with an interior surface having cavities formed therein for accommodating said left and said right grouser retainers.

3. The invention in accordance with claim 2 wherein said cavities of said circumferential belt formed with the longitudinal axis of the cavities perpendicular to the edges of said circumferential belt.

4. The invention in accordance with claim 2 wherein said cavities of said circumferential belt are formed with the cavities nonperpendicular to the edges of said circumferential belt.

5. The invention in accordance with claim 1 wherein said tire is provided with a tread surface having cavities formed therein for accommodating said left and said right grouser retainers.

6. The invention in accordance with claim 5 wherein said cavities are formed in the tread surface of said tire at right angles to a circumferential centerline of said tire.

7. The invention in accordance with claim 5 wherein said cavities are formed in the tread surface of said tire at greater than right angles to a circumferential centerline of said tire.

8. A tracked tire assembly comprising:
   A pneumatic tire having a tread surface;
   a circumferential belt encircling the tread surface of said tire, said belt being in contat with said tread surface of said tire;
   a plurality of left grouser retainers extending part way across the width of said belt, said left grouser retainers accommodated between said tread surface of said tire and said circumferential belt, each of said left grousers having a plurality of apertures therethrough including a second bore spaced substantially inboard from other apertures of said grouser;
   a plurality of right grouser retainers extending part way across the width of said belt toward said plurality of left grouser retainers, said right grouser retainers accommodated between said tread surface of said tire and said circumferential belt, each of said right grousers hving a plurality of apertures therethourgh including a second bore spaced substantialrgh inboard from other apertures of said grouser;
   a plurality of grousers which extend continuously across the width of said circumferential belt and carried on an outer surface of said circumferential belt, each grouser attached to one of said left grouser retainers and one of said right grouser retainers, said grousers including a plurality of apertures including a pair of bores; and
   an auxiliary pin passing through each of said bores of said pairs of bores in said grousers, through said circumferential belt and into said second bores of said left and said right grouser retainers.

* * * * *